United States Patent [19]
Brown

[11] Patent Number: 5,384,909
[45] Date of Patent: Jan. 24, 1995

[54] PRECISION AUTOMATIC SCROLLING FOR AN IMAGE DISPLAY SYSTEM

[75] Inventor: Jerry R. Brown, Gardiner, N.Y.

[73] Assignee: International Business Machines Corporation, Armonk, N.Y.

[21] Appl. No.: 810,465

[22] Filed: Dec. 19, 1991

[51] Int. Cl.⁶ .......................................... G06F 15/40
[52] U.S. Cl. .................................................. 395/155
[58] Field of Search ............... 395/155, 147, 161, 153, 395/157, 158, 133, 138

[56] References Cited

U.S. PATENT DOCUMENTS

| | | | |
|---|---|---|---|
| 4,197,590 | 4/1980 | Sukonick et al. | 364/900 |
| 4,602,346 | 7/1986 | Kawakami et al. | 395/138 X |
| 4,654,651 | 3/1987 | Kishi et al. | 340/731 |
| 4,672,680 | 6/1987 | Middleton | 382/44 |
| 4,725,960 | 2/1988 | Shima et al. | 364/474 |
| 4,736,330 | 4/1988 | Capowski | 395/155 X |
| 4,982,345 | 1/1991 | Callahan et al. | 364/521 |
| 4,991,022 | 2/1991 | Canfield et al. | 358/180 |
| 5,146,557 | 9/1992 | Yamrom et al. | 395/161 |
| 5,253,337 | 10/1993 | Hirose | 395/161 |
| 5,253,338 | 10/1993 | Tanaka | 395/161 |
| 5,263,134 | 11/1993 | Paal et al. | 395/158 |
| 5,263,135 | 11/1993 | Dei | 395/138 X |
| 5,297,240 | 3/1994 | Priem et al. | 395/133 X |

FOREIGN PATENT DOCUMENTS 9117512  11/1991  WIPO .

OTHER PUBLICATIONS

Abstract of EP404955-A entitled "CAD CAM Computer Aid Design Manufacture," by M. Seki et al.

Abstract of Japan-JP 01-314329 entitled "Image Data Processor" by K. Kusumoto et al.

Apple Computer, Inc. 'Inside Macintosh—vol. I, II, and III', Oct. 1991.

Addison-Wesley Publishing Co., Inc., Par. 'Automatic Scrolling' p. I-48-p. I-49.

Patent Abstracts of Japan, vol. 014, No. 462 (P-1113) Oct. 5, 1990, & JP-A-21 83 294 (Fuji Xerox) Jul. 17, 1990 (abstract).

Microsoft Windows User's Guide (Trademark of Microsoft Corporation), 1990, pp. 223-226, 232, 245.

*Primary Examiner*—Heather R. Herndon
*Assistant Examiner*—Cliff Nguyen Vo
*Attorney, Agent, or Firm*—Aziz M. Ahsan

[57] ABSTRACT

A system and method of precision automatic scrolling for use in an image display system. Upon selecting a displayed entity having an off-screen end or other point which is desired to be brought into view, the entity's definitional vector coordinate characteristics are compared to the coordinates of the selection point on the display screen. The results of the comparison provide the XY coordinates of the entity which are furthest from the point of selection. The resulting XY coordinates are then made the new center point of the area in view. The current level of magnification is maintained during this operation. The present system and method thus eliminates the need for manual panning/scrolling or demagnification to bring the desired endpoint into view. The present system and method can also be applied to locate and display a nearest endpoint or a closest point of intersection between two entities.

4 Claims, 5 Drawing Sheets

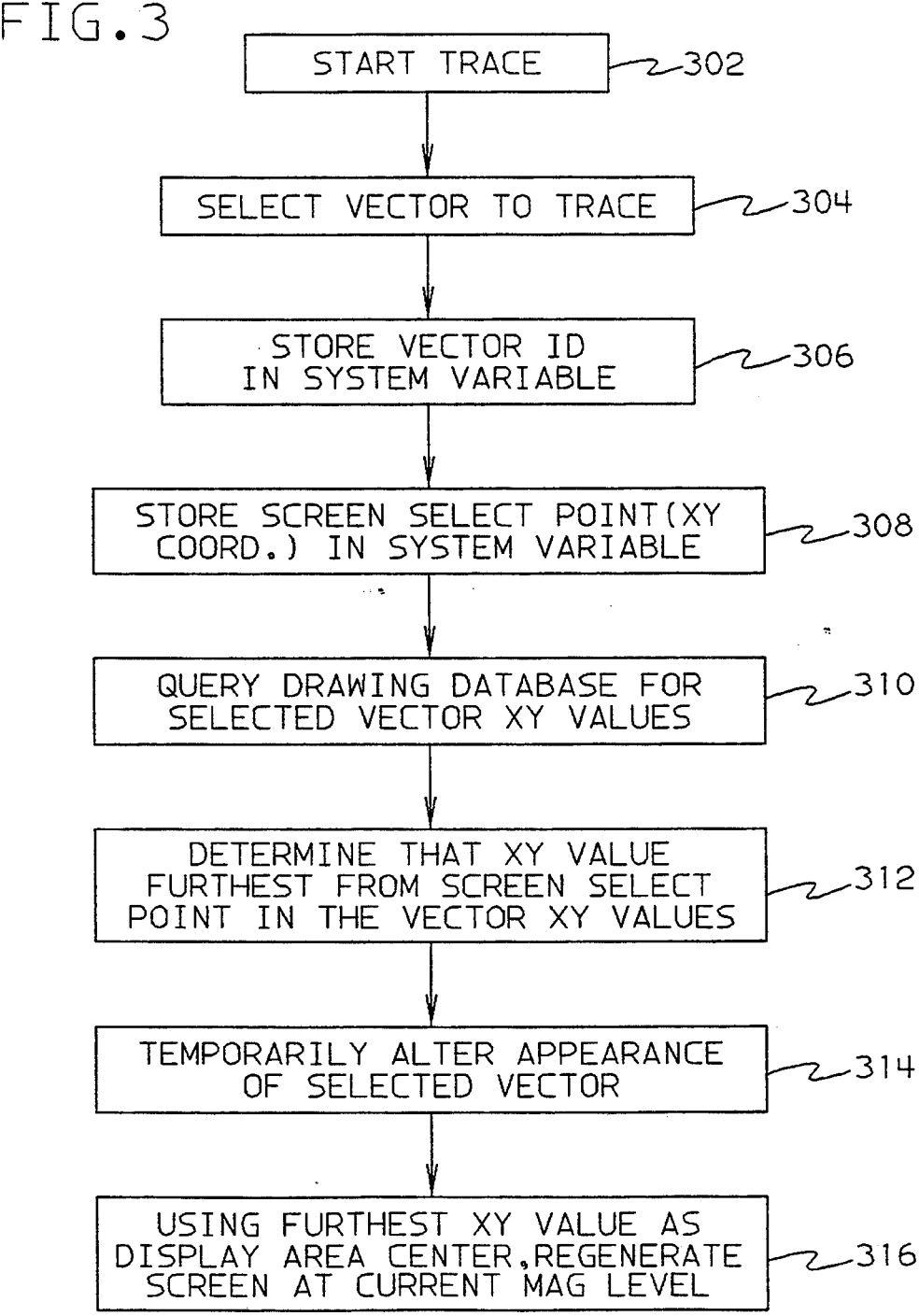

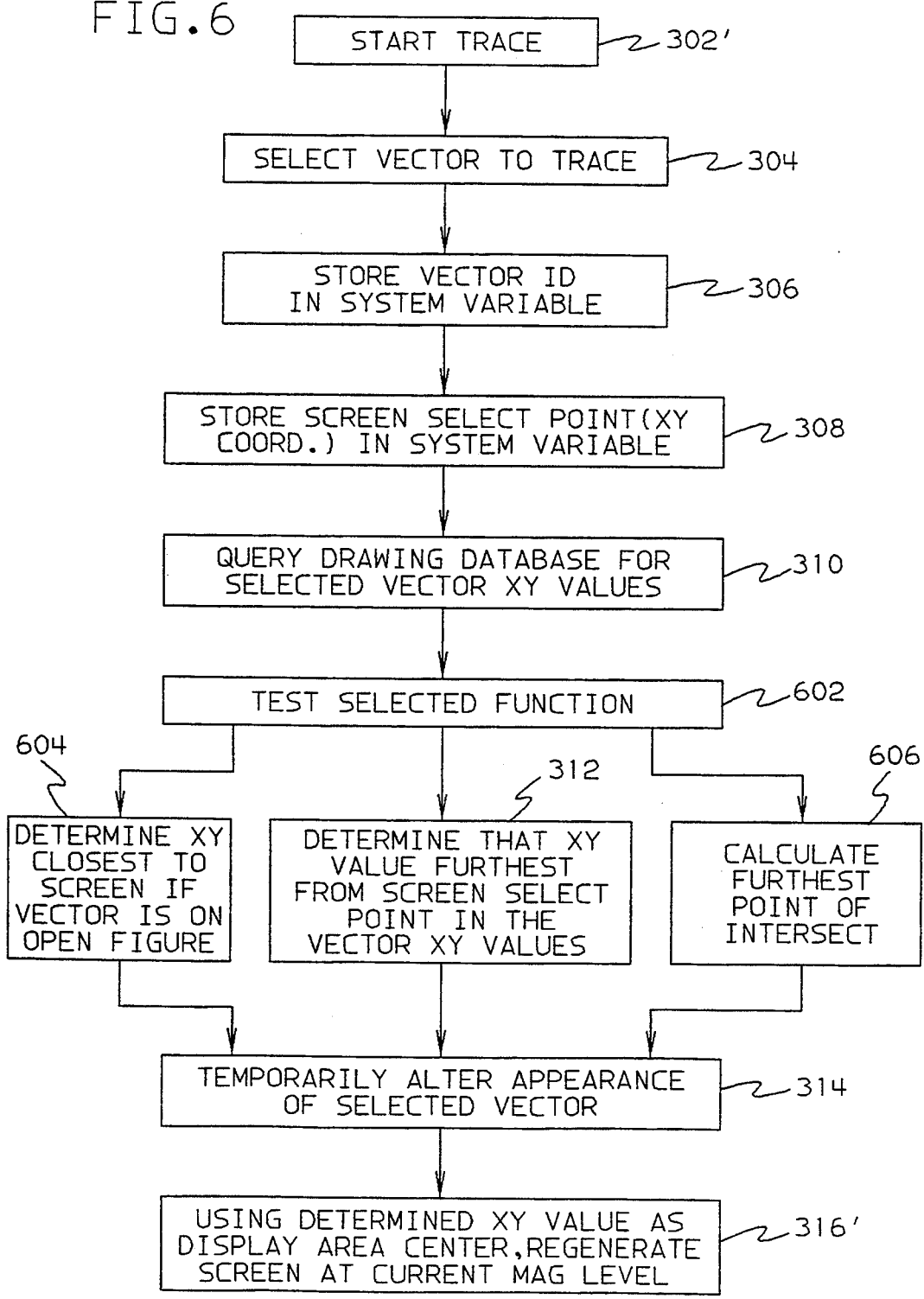

PRECISION AUTOMATIC SCROLLING FOR AN IMAGE DISPLAY SYSTEM

I. BACKGROUND OF THE INVENTION

A. Field of the Invention
B. Related Art

When viewing graphics, for example CADAM type drawings, it is often necessary to zoom or magnify some portion of the image. In order to move another part of the drawing not currently visible, the user typically needs to either demagnify the image or pan and/or scroll the magnified drawing.

On many occasions, it is necessary or desirable to bring into view an area of the image surrounding an end or other point, not currently in view, of a component having another end or point which is in the view. While demagnification or panning/scrolling can typically be used to view the end of a given line, these methods are time consuming and often frustrating.

II. SUMMARY OF THE INVENTION

According to a preferred embodiment of the present system and method, upon selecting the entity whose other end is desired to be brought into view, the entity's definitional characteristics are compared to the coordinates of the selection point on the screen. The results of the comparison provide the XY coordinates of the entity which are furthest from the point of selection. The XY coordinates are then made the new center point of the area in view. The current level of magnification is maintained during this operation. The present system and method thus eliminates the need for manual panning/scrolling or demagnification to bring the desired endpoint into view.

The aforedescribed system and method can also be applied to find the closest endpoint or a closest point of intersection. By using a three button mouse any one of three different desired points can be selected.

III. BRIEF DESCRIPTION OF THE DRAWINGS

The present invention will be better understood by reference to the appended drawing, in which:

FIG. 3 is a flow chart illustrating a display method according to an embodiment of the present invention;

Figure 5:
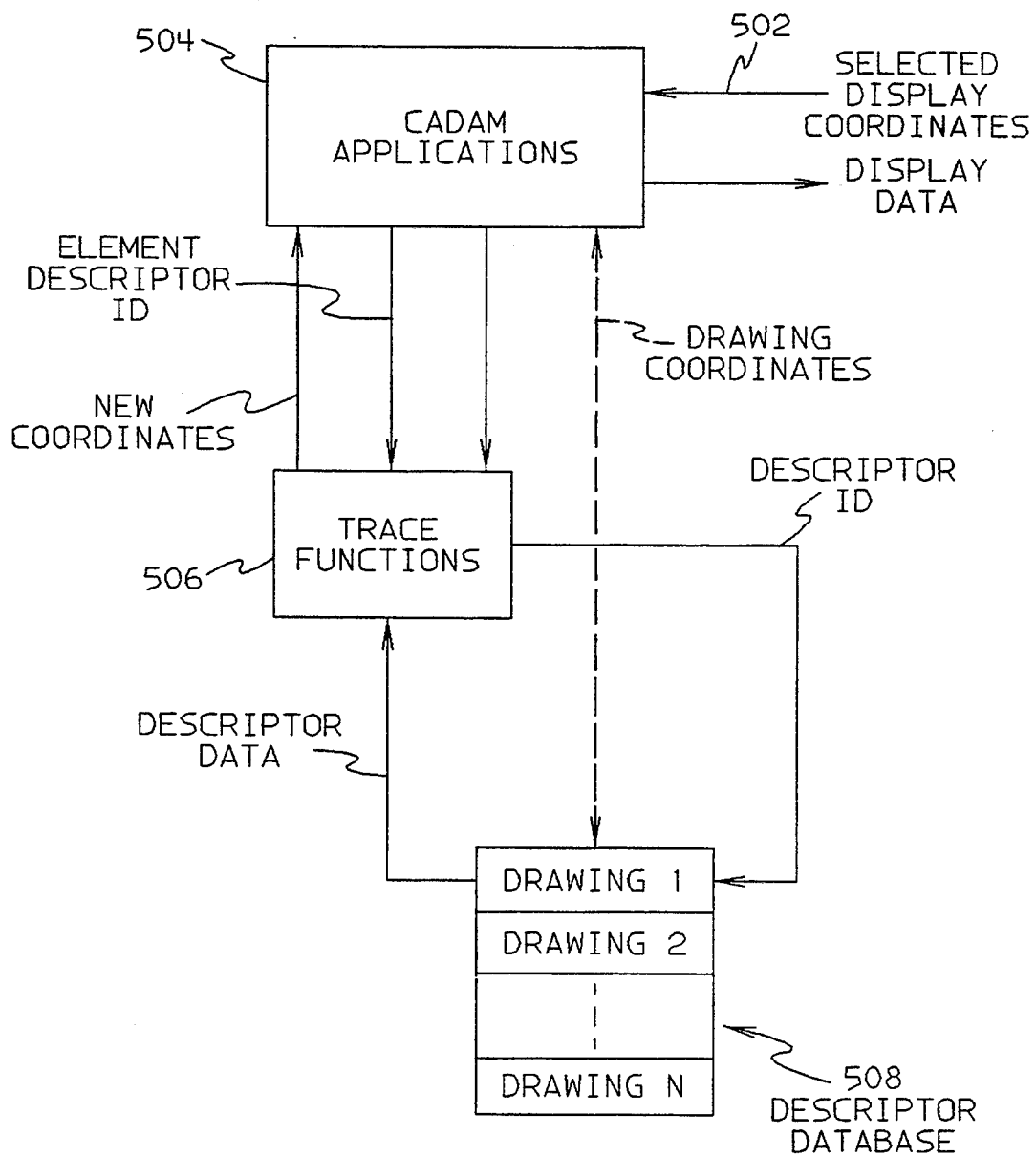
Figure 4:
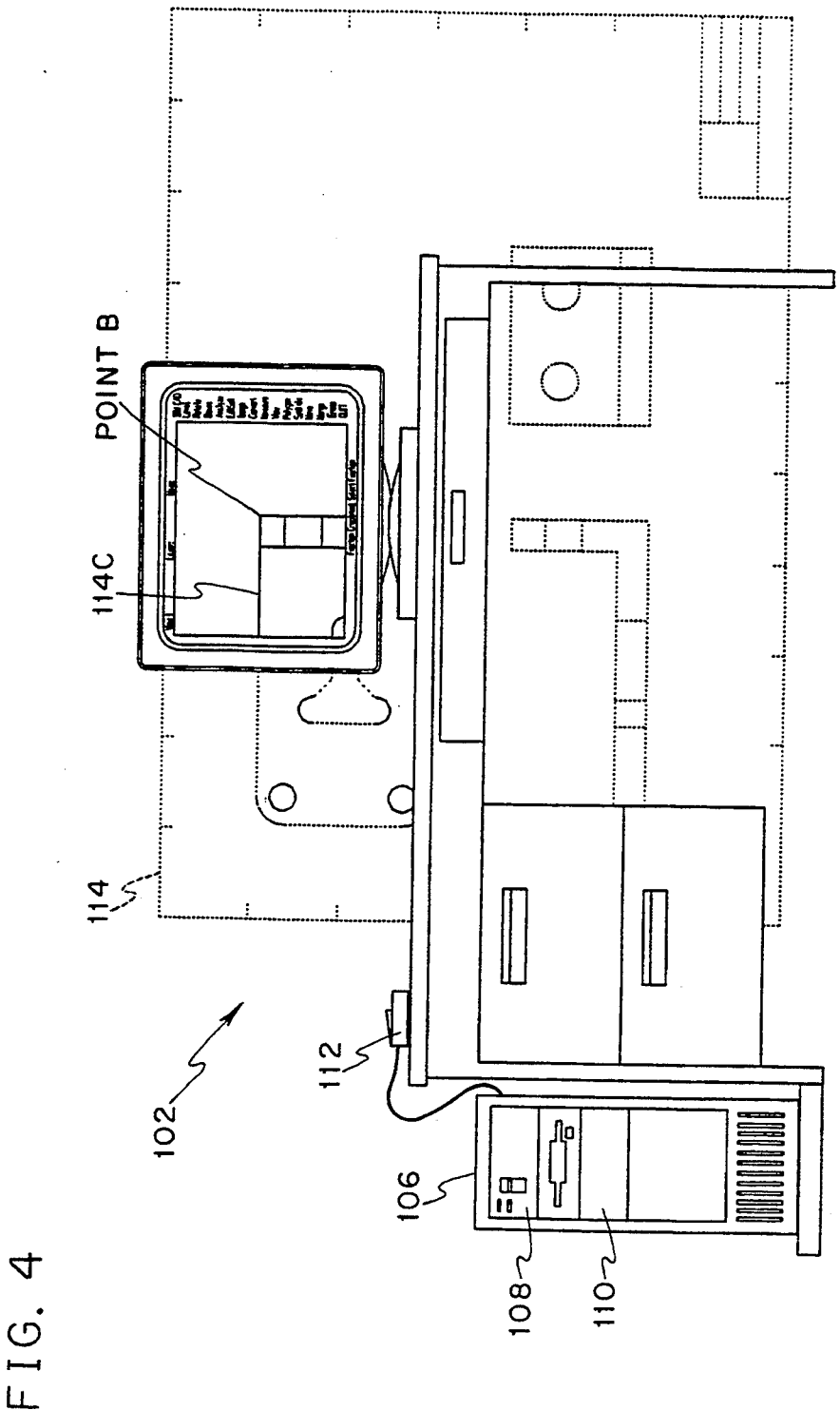
FIG. 4 depicts the workstation of FIG. 1 after implementation of the display method of FIG. 3.

FIG. 5 is a functional data flow diagram showing the data flow between the user input, the applications software and the vector descriptor database; and, FIG. 6 is a flow chart of an alternative embodiment of the present invention wherein a user can select, alternatively, functions to find the nearest endpoint, the furthest point or a first point of intersection with another vector to be centered and displayed on the display screen of FIG. 4.

Like reference numerals appearing in more than one FIGURE designate like components.

IV. DESCRIPTION OF THE PREFERRED EMBODIMENT

Figure 1:
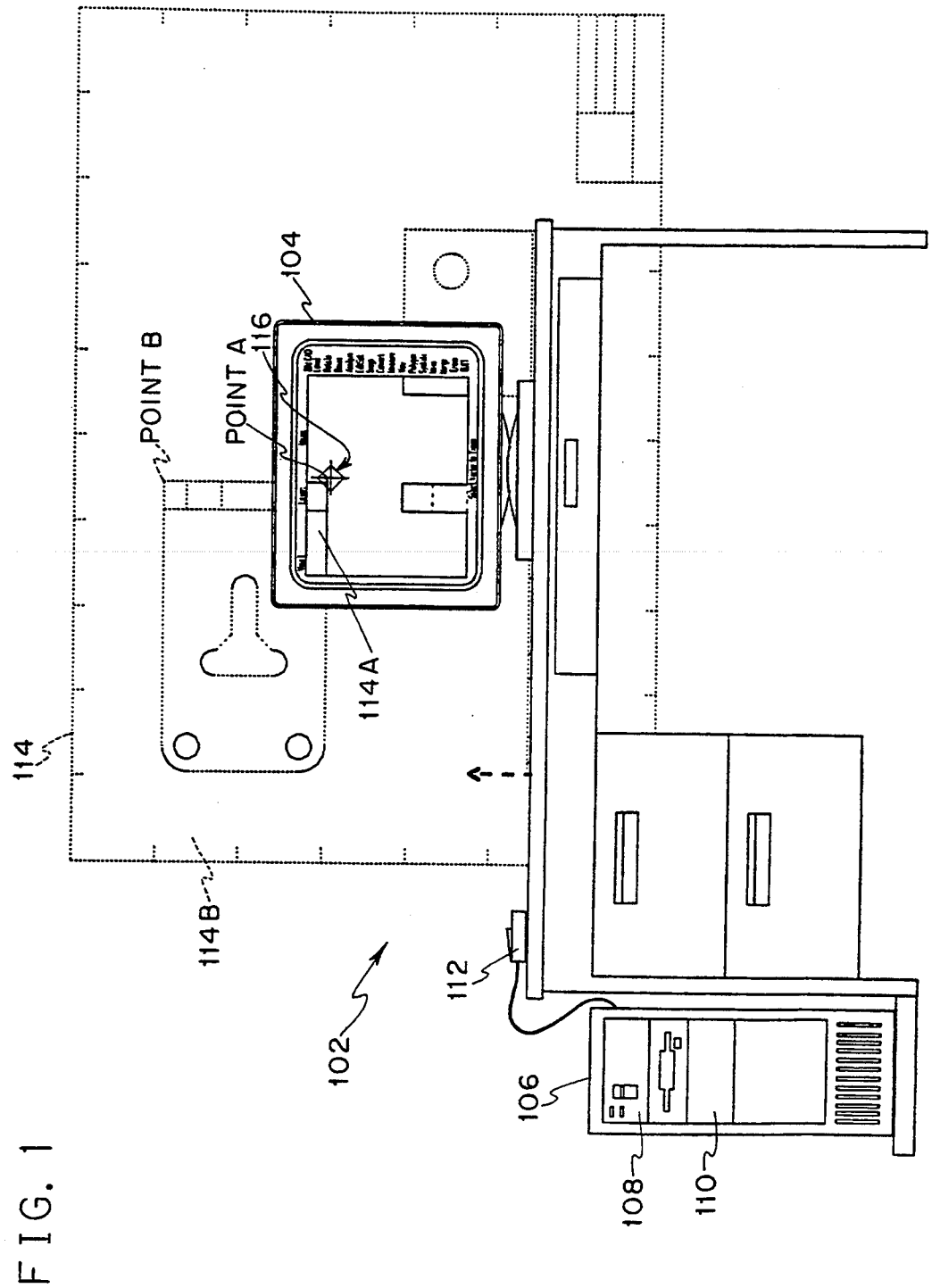
FIG. 1 depicts a workstation of a type within which the present invention can be embodied.

Turning first to FIG. 1, there is depicted a graphics workstation of a conventional type, within which the present invention can be embodied. The workstation 102 of FIG. 1 includes a graphics display 104 (for example, an LCD or CRT type display) and a workstation processor 106. The workstation processor includes a data processing unit 108 having a random access memory and a mass storage device 110 such as a hard drive or DASD. The workstation 102 also includes an alphanumeric keyboard (not shown) and may also include a pointing/selection device 112 such as a mouse or track ball.

According to an embodiment of the present invention, the workstation processor 106 preferably includes a graphics processor having provision for performing conventional vector graphics. In such systems, as in the preferred embodiment of the present system, drawings are defined as a set of vector descriptors (graphics primitives) within a database stored on the mass storage device 110. The graphics processor converts these images into a format that can be displayed on the graphics display 104. Such graphics processors are well known in the art. Example of such graphics processors are described in U.S. Pat. Nos. 4,805,116 and 4,982,345, which are incorporated by reference herein.

The workstation 102 also includes CAD drawing application software such as IBM CAD (a product of IBM Corporation of Armonk, N.Y.). The applications software performs functions such as controlling the drawing function, creating the graphics primitives, commanding storage and retrieval the graphics primitives to/from the mass storage device, and providing the user interface.

Figure 2:
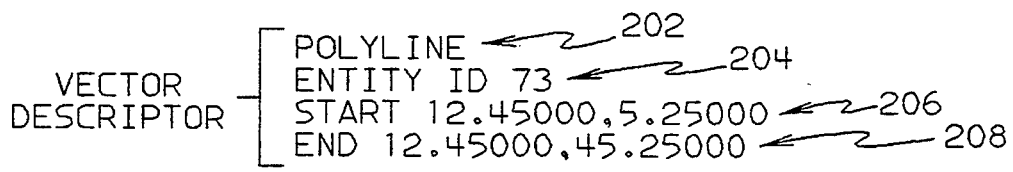
FIG. 2 is an example of a drawing vector as stored in a database within the workstation of FIG. 1.

An example of how such a vector descriptor might be stored on the data base illustrated in FIG. 2. In this embodiment, an exemplary vector descriptor defining a polyline comprises a first part 202 which defines the vector type, a second part 204 which provides a vector or entity ID by which the vector is referenced, vector XY start coordinates 206 within the full drawing and vector XY end coordinates 208 within the full drawing. The vector descriptor can also include other definitional information. For example a default color descriptor defining the display color of the vector in question can be provided as part of the vector descriptor.

Turning again to FIG. 1, traditionally, once a CAD type drawing 114 has been displayed at a magnified level a first portion 114a of the drawing 114 will be visible on the display screen (or within a display window) while a second portion 114b (indicated by dotted lines) will be off the display screen or outside of the display window and thus not visible to the user. There are various reasons why a user might need to view a portion of a drawing which is not displayed and/or select a point within this non-displayed portion. Conventionally navigational tools such as panning and scrolling or demagnification are used to bring a different view of the drawing onto the display.

An example of why a user might need to view a portion of a drawing not currently in view is dimensioning (e.g. determining length along a given line or axis). As is sometimes the case with dimensioning the drawing, the user selects two end points to dimension on. In very dense drawings, where many vectors in an area make it difficult to select the desired vector, the user may need to work at a high level of magnification. In such circumstances, a first end point (A) may be visible on the display screen and can thus be immediately selected. A second end point (B) may, however, be off screen. In order to select this second end point the user could demagnify, reorient the drawing, magnify a new area within which the second point is visible and then perform the selection. As a conventional alternative, the user could use other methods such as panning and/or scrolling. The problem with such methods is, however, that they can waste valuable design or drafting time.

The magnification/demagnification method, for example, requires extra steps and searching on the part of the user. In the case of panning or scrolling, the user may have to make one or more blind guesses in which direction to pan or scroll. In contrast, applying the principles of the present invention, by making use of the drawing database contents relating to the vector to be dimensioned, the user selects that vector and the panning distance is calculated by the processor as that which would place the furthest end of the vector selected in the middle of the screen.

A flow chart of a display method according to an embodiment of the present invention is illustrated in FIG. 3. Assume that a user, looking at the displayed view on the display of FIG. 1, needs to view point B. Currently, point A is within the current view at the current magnification level. First, in step 302, the user initiates the "trace" function, which according to an embodiment of the present invention is embodied as program code within the drawing application software. The "trace function" can be selected in a number of different ways. For example, the function can be initiated by way of a menu selection on the display screen or a tablet menu overlay. Alternatively, the function can be initiated by way of a defined keyboard stroke or strokes. Following the initiation of the "trace" function, in step 304 the user selects the vector (in the present example, the vertical line at point A) as the line he wishes to trace. The selecting can be accomplished by using the pointing device to move cross hairs and/or a selection box (116 in FIG. 1) to the point to be selected and by pressing a button on the pointing device or by using defined keystrokes. Upon selecting the line to be traced, in step 306 the trace function stores the Vector ID of the selected line in a first temporary data storage location. In addition, in step 308, the code stores the XY coordinates of the selected point (in the present example, point A) in a second temporary data storage location.

After the vector ID of the line and XY coordinates of the selected point have been stored, in step 310 the trace function performs a database search of the drawing file to determine the XY coordinate sets which define the selected vector. Then, in step 312, the trace function compares this XY vector definitional data to the selected XY point and determines the XY coordinates of the point in the vector which is furthest from the user selected point. It will be understood, that in instances where the descriptor defines a polygon, the coordinates returned will define a point on the polygon perimeter which is furthest from the selected XY coordinates. In the case of a line, the coordinates returned will define the furthest endpoint from the selected XY coordinates.

Following the compare function, in step 314 the function alters the color attribute of the selected line. The temporary change in color remains until the line is deselected. It should be understood that as an alternative to color alteration, the appearance of the selected line could be temporality altered in other ways for example by displaying it in bold, dashed (broken) or dotted format. After the color attribute of the line has been altered, in step 316, the function causes the system to place a new view of the drawing on the workstation display. The new view is displayed at the current level of magnification, and using the furthest point from the selection point (calculated in step 312) as the screen center.

A source code listing of an embodiment of the trace function software is shown in Appendix A. The software of Appendix A is written in the CADForth language which is an extension of FORTH '83.

FIG. 5 is a functional data flow diagram showing the data flow between the user input 502, the applications software 504, 506 and the vector descriptor database 508.

The present invention is useful for for both mechanical and schematic type drawings. For example, one may wish to locate a next node connecting two components, where each component is defined by a single descriptor. In such a case the present system could be used to find the furthest (or nearest) node connecting two components.

FIG. 6 is a flow chart of an alternative embodiment of the present invention wherein a user can select, alternatively, functions to find the nearest endpoint, the furthest point or a first point of intersection with another vector to be centered and displayed on the display screen. In such an embodiment these functions can can enabled using three alternative sets of key strokes or, alternatively, can be enabled by using alternative buttons (or combinations thereof) on a three button mouse after initiating the line trace function. Advantageously, the embodiment of FIG. 6 can share much of the same code used to implement the function to find the furthest point.

In step 302' the trace function is started. At this time the particular subfunction can be selected by using keystrokes or from a menu. Alternatively, function selection can be made after entering the trace routine (in the same manner as the embodiment of FIG. 3) by selecting a component (defined by a single primitive) using alternative buttons on a three button mouse. In any event, steps 304–310 proceed as described with respect to the embodiment of FIG. 3. In step 602 a test is made to determine which function was selected. If the furthest point function was selected, step 312 is performed. If the closest end point function was selected, and the selected component is defined as a line (or open shape), in step 604 the system uses the database vector descriptor data to determine the closest endpoint to the selected point. If the descriptor data defines a polygon, an indication of such is provided to the user and no further action is taken. If the first point of intersection value is selected, in step 606, using methods known in the art, the points of intersection between the primitive defining the selected component and the primitives defining the other components in the drawing are determined and the closest point of intersection to the selected point on the selected component is determined. Next, in step 316', a new frame is displayed having a center point defined by the point determined in the selected one of steps 312, 604 or 606.

Now that the invention has been described by reference to the preferred embodiments various modifications and enhancements which to not depart from the scope and spirit of the invention will become apparent to those of skill in the art. Thus, it should be understood that the foregoing description has been provided by way of example and not as a limitation. The scope of the invention is defined by the appended claims.

APPENDIX A

```
BEGIN-OPTION Line_Tracer
MESSAGE-MENU ONE-END
BEGIN-MENU ONE-END
$" Select Line to Trace to other End" UNSELECTABLE
MENU-ITEM
END-MENU
TRUE FLAG FIRST-TIME?
DB-POSITION NEW-LINE
DB-POSITION LAST-LINE
VARIABLE PICKED-LINE-COLOR
: UNMARK-LINE ( — )
SAVE-POSITION NEW-LINE
RESTORE-POSITION LAST-LINE
SHAPE UNDRAW
PICKED-LINE-COLOR @ SHAPE WRITE-DB
LINE-COLOR
SHAPE DRAW
RESTORE-POSITION NEW-LINE
;
: 1ST-PT (— v)
SHAPE READ-DB ENTITY DROP
@GEOM DROP
;
: F2TUCK (V1 V2 — V2 V1 V2 ) F2SWAP F2OVER ;
FVARIABLE FURTHEST-DISTANCE
CREATE FURTHEST-SO-FAR 2 REALS ALLOT
: FURTHEST-PT (marker# — v)
SHAPE-PT>XY
—1E0 FURTHEST-DISTANCE F!
1ST-PT
BEGIN F4DUP V-DISTANCE
FDUP FURTHEST-DISTANCE F! FURTHEST-SO-FAR
F2!
ELSE FDROP F2DROP
THEN
@GEOM END =
UNTIL
F2DROP FURTHEST-SO-FAR F2@ ;
: Line_Tracer-MAINWORD ( — )
BEGIN 0 SHAPE ACCEPT-TYPE
2-D LINE SHAPE ACCEPT-TYPE
ONE-END GET-SHAPE-PT
FIRST-TIME? NOT IF UNMARK-LINE
THEN RESET FIRST-TIME?
SHAPE READ-DB LINE-COLOR PICKED-LINE-COLOR !
RED SHAPE WRITE-DB LINE-COLOR
SAVE-POSITION LAST-LINE
OPTION-CLEANUP: UNMARK-LINE
FURTHEST-PT WINDOW-CENTER-Y
WINDOW-CENTER-X
GLOBAL DRAW
AGAIN ; END-OPTION
```

Having thus described my invention, what I claim as new and desire to secure by Letters Patent is:

1. A graphics processing system, comprising:
   a graphics display;
   a data processing unit coupled to said graphics display and comprising a graphics processor, said graphics processor comprising means for generating a display vector from definitional data;
   pointing device coupled to said data processing unit for selecting a first point on a portion of a drawing visible on a current display frame;
   a storage device comprising a storage media having data stored thereon, defining components within said drawing in vector format;
   data access means, coupled to said pointing device, for determining a component including said first point and for retrieving a set of said data defining said component from said storage device;
   input means, for selecting a function to determine a second point on said drawing, said second point being within an area of said drawing not currently being displayed;
   calculation means, coupled to said input means and said data access means, for processing first coordinates indicative of said first point and said set of data defining said component in accordance with said function so as to determine second coordinates of said second point on said component; and,
   display control means, coupled to said graphics display for causing said graphics display to display a second display frame including an area of said component surrounding said second point.

2. The apparatus of claim 1 wherein said calculation means comprises means for determining a point of intersection furthest from said first point of said component with another component and for setting said second coordinates so as to be indicative of said point of intersection.

3. The apparatus of claim 1 wherein said second point determined by said calculation means is located at a distance furthest from said first point.

4. The apparatus of claim 1 wherein said display control means comprises means for causing said second display frame to be centered around said second point and to be displayed immediately subsequent to said current display frame.

* * * * *